United States Patent [19]

Miyagishima

[11] 4,064,601

[45] Dec. 27, 1977

[54] WELL LINE STRAP CONNECTION

[75] Inventor: Tosh Miyagishima, Simi Valley, Calif.

[73] Assignee: Hydril Company, Los Angeles, Calif.

[21] Appl. No.: 660,440

[22] Filed: Feb. 23, 1976

[51] Int. Cl.² ............................................. B65D 63/00
[52] U.S. Cl. ............................... 24/16 PB; 24/81 CC;
174/47; 248/74 PB; 285/137 R; 285/423
[58] Field of Search ........... 285/137 R, 423, DIG. 22, 285/9 M; 174/47, 136; 248/74 R, 74 B, 74 PB; 24/16 PB, 81 CC

[56] References Cited

U.S. PATENT DOCUMENTS

| | | | |
|---|---|---|---|
| 3,026,587 | 3/1962 | Spencer | 24/16 PB |
| 3,214,808 | 11/1965 | Litwin | 24/16 PB |
| 3,445,898 | 5/1969 | Goodrich | 24/16 PB |
| 3,590,442 | 7/1971 | Geisinger | 24/16 PB |
| 3,618,173 | 11/1971 | Schwartz | 24/16 PB |
| 3,740,801 | 6/1973 | Sears et al. | 285/137 R |
| 3,757,387 | 9/1973 | Bush et al. | 24/81 CC |
| 3,893,647 | 7/1975 | Kennedy | 248/74 PB |

FOREIGN PATENT DOCUMENTS

| | | | |
|---|---|---|---|
| 1,207,065 | 8/1959 | France | 174/47 |
| 1,291,172 | 10/1972 | United Kingdom | 24/16 PB |

*Primary Examiner*—Dave W. Arola
*Attorney, Agent, or Firm*—William W. Haefliger

[57] ABSTRACT

A well line strap connection comprises:
a. a lengthwise elongated flexible strap, and
b. a keeper connected to the strap,
c. the keeper having a recess at the innerside thereof and extending through the keeper in a transverse direction relative to the length direction of the strap,
d. the keeper having a through socket to pass the free end of the strap, and
e. there being means carried by the coupling proximate the socket to positively interlock the strap to the keeper in response to feeding of the strap through the socket.

The recess in the keeper is typically sized to pass an auxiliary line or lines to be coupled to well pipe.

13 Claims, 10 Drawing Figures

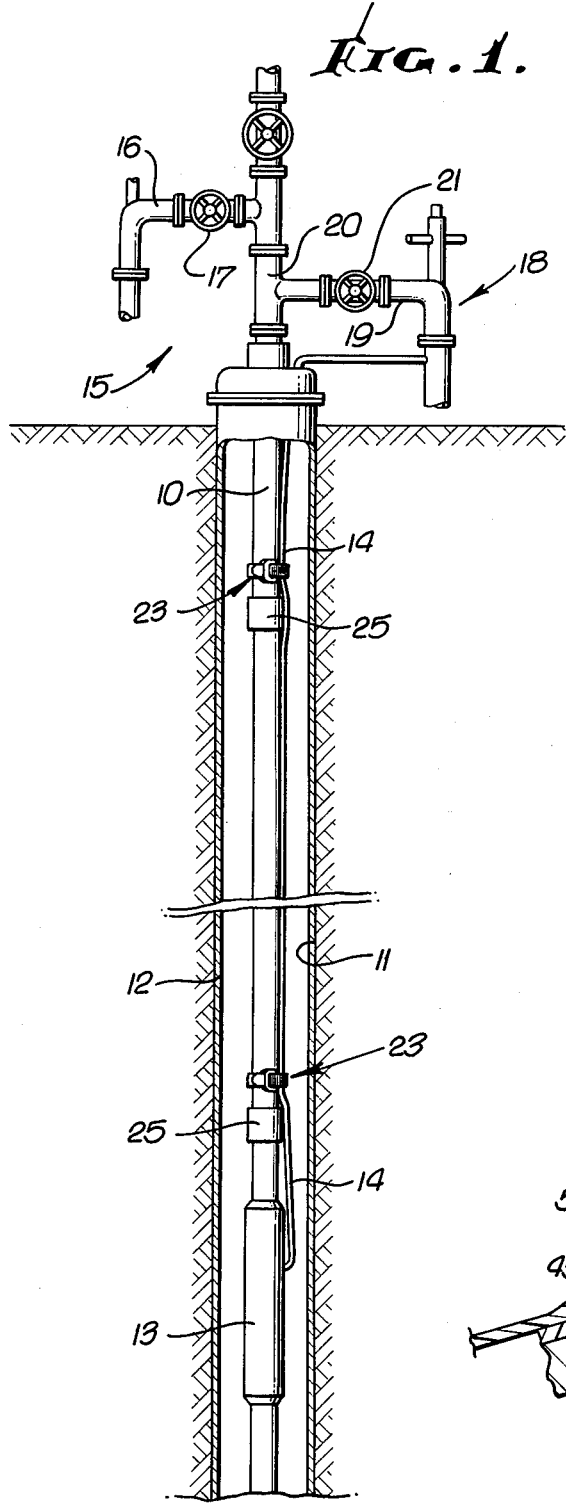
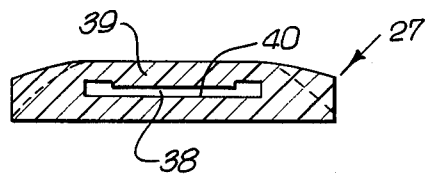
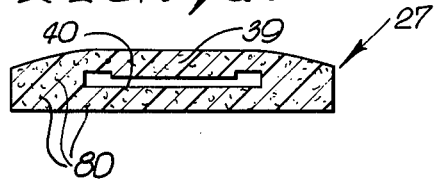
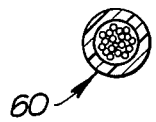
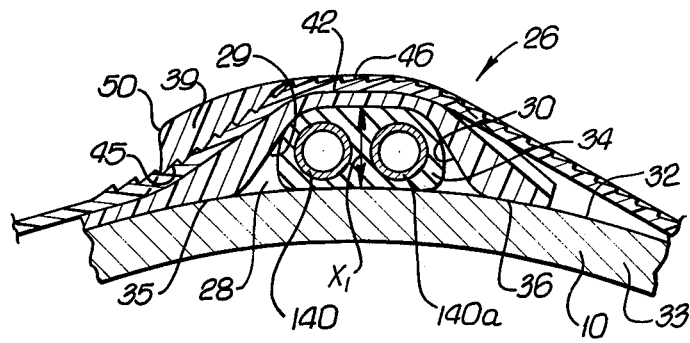

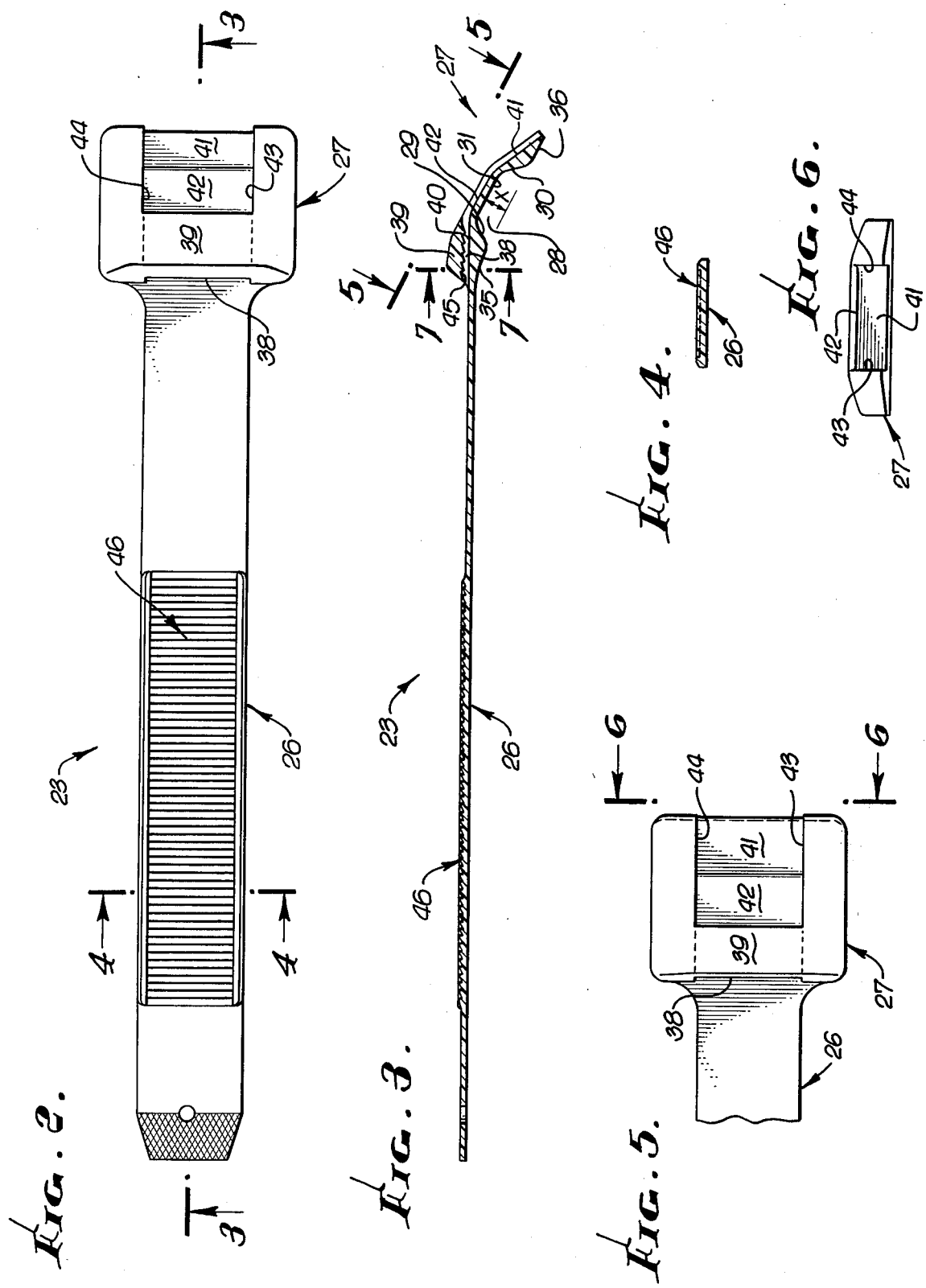

WELL LINE STRAP CONNECTION

BACKGROUND OF THE INVENTION

This invention relates generally to couplings, and more particularly concerns a flexible strap connection adapted to quickly couple relatively small diameter lines to larger size well pipe.

There is a continuing need for effective devices to rapidly couple pressure lines to well tubing as the latter is run into a well. Such lines must be retained closely adjacent the tubing so that they do not become severely damaged during running of the tubing into or out of the hole. Prior known connector devices for this purpose do not embody the unusually advantageous features of construction, modes of operation and results as are now afforded by the present invention. Among these are low-cost, one-piece construction, ease and rapidity of application to the well tubing, and disposability.

SUMMARY OF THE INVENTION

Basically, the invention is embodied in a coupling that includes:

a. a lengthwise elongated flexible strap, and
b. a keeper connected to the strap,
c. the keeper having a recess at the inner side thereof and extending through the keeper in a transverse direction relative to the length direction of the strap,
d. the keeper having a through socket to pass the free end of the strap, and
e. there being means carried by the coupling proximate the socket to positively interlock the strap to the keeper in response to feeding of the strap through the socket.

As will be seen, the keeper and strap may be of one-piece molded plastic construction; the keeper or buckle may have a cross-piece at the outer side of the socket, and the interlock means may advantageously include ratchet interlocking elements on the cross-piece and strap in the form of transverse serrations on the outer side of the strap and inner side of the cross-piece. Further, the recess may have trapezoidal cross section in lengthwise planes normal to the strap, whereby the elastomer holder for the auxiliary line or lines may be resiliently compressed inwardly and sidewardly in response to make-up of the coupling about the pipe. As a result, the interlock of the strap and cross-piece ratchet serrations is energized to achieve positive interlock. To this end, the keeper may be provided with a "downhill" ramp surface inwardly of the cross-piece and angled to urge the strap toward the cross-piece in response to endwise tension in a direction tending to loosen the coupling.

These and other objects and advantages of the invention, as well as the details of an illustrative embodiment, will be more fully understood from the following description and drawings, in which:

DRAWING DESCRIPTION

FIG. 1 is an elevation showing the environment of the invention;

FIG. 2 is a front elevation showing a coupling embodying the invention;

FIG. 3 is a section on lines 3—3 of FIG. 2;

FIG. 4 is an enlarged section taken on lines 4—4 of FIG. 2;

FIG. 5 is a plan view on lines 5—5 of FIG. 3;

FIG. 6 is an end view on lines 6—6 of FIG. 5;

FIG. 7 is an enlarged section on lines 7—7 of FIG. 3;

FIG. 7a is another view like FIG. 7; and

FIG. 8 is a fragmentary section showing attachment to a well pipe, and FIG. 8a is a line section.

DETAILED DESCRIPTION

FIG. 1 illustrates one highly advantageous application of the invention, there being well tubing 10 extending in a well 11 cased at 12. A surface-controlled subsurface valve unit 13 is connected in series with the tubing. Merely as illustrative, U.S. Pat. No. 3,035,808 describes one such sub-surface valve unit, it being understood that there are many forms of such valves. The function of the latter is to control the upward flow of well fluid in tubing such as 10, pursuant to the presence or absence of sufficient control pressure application in a small control line or lines 14 extending from the surface alongside the tubing to the valve location. Typically, in the presence of such control pressure transmission, the valve unit remains open to pass well fluid to suitable well head equipment 15 that includes a production line 16 which is valve controlled at 17; however, should sufficient control pressure fail to be transmitted, inadvertently or otherwise, the valve unit will close, providing for positive shut off or well production. A control pressure supply means is shown at 18, and may be connected by line 19 to the well head casing 20 that receives the production flow, to use the pressure of such fluid in the generation of control fluid pressure. Accordingly, if surface valve 21 in line 19 is open, pressure is supplied to the sub-surface valve to keep it open, whereas if valve 21 is closed, the sub-surface valve will close. These considerations apply to one unusually advantageous application of the invention, there also being other applications. FIG. 1 also illustrates the use of apparatus for connecting the control pressure line 14 to the relatively larger diameter well tubing, such retention apparatus taking the form of couplings generally designated at 23. The latter may be coupled to the tubing at locations, as shown, just above the joints 25 that interconnect the individual tubing lengths or stands, so as to minimize the time required for running the tubing into and out of the hole. It will be understood that the smaller control line (or lines) 14 is also typically made up by end-interconnecting sections thereof, using threaded couplers, as the tubing is run into the hole.

Extending the description to FIGS. 2–7, the coupling 23 includes an elongated, flexible strap 26 and a keeper 27 connected to the strap at one end. Typically, the strap and keeper are of one-piece, relatively stiff molded plastic construction, one such plastic material consisting of polyurethane. The keeper has a recess 28 at its inner side, the recess extending through the keeper in a transverse direction, i.e. relative to the length direction of the strap. In FIGS. 1 and 3, the recess extends vertically. The recess is advantageously trapezoidal in cross section, as indicated by the side walls 29 and 30 flaring outwardly away from the innerwall 31. As a result, when the keeper is coupled about convexly curved outer wall 32 of pipe 33, as seen in FIG. 8, the keeper flexes, resiliently, and the side walls 29 and 30 tend to relatively approach one another (i.e. the recess width narrows) to compress the elastomeric holder body 34 between walls 29 and 30, and also increasingly clamp it against the pipe outer wall. Note the auxiliary pressure conduits 140 and 140a passing lengthwise through the control line holder body 34, in FIG. 8. The dimension "X" between the inner wall 31 and the surface defined by keeper flats 35 and 36 engageable with the pipe is approximately the same or slightly less than the uncompressed radial dimension $X_1$ of the body 34, as seen in FIGS. 2 and 8.

The keeper also has a through socket 38 to pass the free end of the strap, during tightening of the coupling about a pipe. That socket is typically formed by and between a cross-piece 39 extending tranversely at the outer side of the socket, and by the keeper ramp surface 40, inwardly of that cross-piece. In this regard, the keeper also includes another ramp surface 41 and an outward facing crest surface 42 interconnecting the two ramp surfaces 40 and 41. Surfaces 40 and 41 flare relative to surface 42 at lesser angles than side walls 29 and 30 flare relative to inner wall 31. Surfaces 41 and 42 are sunk slightly into the keeper body, to form a continuous channel, with strap edge guide walls 43 and 44.

Finally, means is carried by the coupling proximate the socket to interlock the strap to the keeper in response to endwise feeding of the strap through the socket. Such means may, with unusual advantage comprise ratchet interlocking elements to prevent loosening slippage of the made-up coupling, and in the example such elements are defined by transversely extending ratchet serrations 45 on the innerside of the cross-piece, and ratchet mating serrations 46 on the outerside of the strap. Such serrations have saw tooth cross-sections in lengthwise extending planes normal to the strap face, and their overall lengthwise extent on the strap is several times greater than their extent in that direction on the cross-piece, as is clear from FIG. 3. Accordingly, a wide range of adjustability to different size pipes is preserved. Inasmuch as the cross-piece faces the "downhill" extent of the keeper (with respect to the leftward direction of feeding of the strap through the socket), i.e. downhill ramp surface 40, the strap serrations 46 tend to be urged by the ramp surface 40 toward the cross-piece serrations 45, in response to rightward pulling of the strap in FIG. 8. Such rightward force on the strap results from tensioning of the coupling about a pipe, to retain the holder body 34 in compressed condition against the pipe outer wall. Such interaction is further facilitated bu the close sliding fit of the strap to the surface 40 and serrations 45. Accordingly, the lock-up if the serrations is self-energized, to prevent inadvertent release of the coupling.

When such release is desired, the coupling may simply be severed crosswise, and disposed of, the inexpensive construction of the coupling enabling such usage. Further, disposability facilitates the construction of the lock-up to be irreversible, positively preventing release until such time as the coupling is severed. Reliability is thereby assured. Impact of the curved outer surface 50 of the cross-piece against the casing inner wall tends to resiliently compress the keeper, and to prevent release of the ratchet teeth interlock.

FIG. 8a is a section through an electrical line or cable 60 that may be used in place of line 14, to communicate between a sub-surface actuator or sensor, and surface electrical equipment. Other communication lines may be used, so long as they fit within the recess 28.

Finally, the plastic material of the coupling 23 may contain comminuted iron particles, or other magnet attracted metal, distributed in the molded plastic in sufficient quantity as to enable the coupling, or part thereof, to be fished out of a well as by a wire line suspended magnet. FIG. 7a shows such iron or ferrous particles 80 distributed throughout cross piece 39.

I claim:
1. In a coupling,
    a. a lengthwise directionally elongated flexible strap, and
    b. a keeper connected to the strap,
    c. the keeper having a recess at the innerside thereof and extending through the keeper in a transverse direction relative to the length direction of the strap,
    d. the keeper having a transverse cross-piece and a through socket to pass the free end of the strap, the socket defined in part by the cross-piece, the keeper also having a first ramp surface underlying the cross-piece and a crest surface outwardly exposed beyond the cross-piece in said lengthwise direction, and
    e. there being means carried by the coupling proximate the socket to positively interlock the strap to the keeper in response to feeding of the strap through the socket, said interlock means including ratchet interlocking elements on the cross-piece and on the outerside of the strap,
    f. the keeper having a second ramp surface, said two ramp surfaces respectively located opposite the opposite sides of the recess and said crest surface overlying the center portion of the recess.

2. The coupling of claim 1 wherein the keeper and strap are of one-piece molded plastic construction.

3. The coupling of claim 2 including magnetically attractive material contained within the coupling.

4. The coupling of claim 2 wherein the plastic consists of polyurethane.

5. The coupling of claim 1 wherein said element comprise transversely extending serrations on the innerside of the cross-piece and on the outerside of the strap, lengthwise thereof.

6. The coupling of claim 1 wherein said recess has trapezoidal cross-section in planes normal to the strap and extending lengthwise thereof.

7. The coupling of claim 1 including a pipe about which the coupling is tightened with the strap extending through the socket.

8. The coupling of claim 7 including an auxiliary line extending along the pipe and through the recess, the keeper holding the auxiliary line clamped to the pipe.

9. The coupling of claim 8 wherein said auxiliary line comprises a communication line.

10. The coupling of claim 8 wherein the auxiliary line comprises fluid pressure conduit.

11. The coupling of claim 10 wherein the auxiliary line includes an elastomeric holder passing the conduit, the holder received in the recess and clamped against the pipe.

12. The coupling of claim 1 wherein the first ramp surface is angled relative to the cross-piece to urge the strap extent in the socket toward the cross-piece, in response to endwise tension exerted on the strap in a direction tending to loosen the coupling.

13. The coupling of claim 1 wherein the cross-piece is offset from and at one side of the said crest surface, in said longitudinal direction.

* * * * *